United States Patent [19]
Spieldiener et al.

[11] Patent Number: 6,062,350
[45] Date of Patent: May 16, 2000

[54] BRAKING SYSTEM FOR AN AMUSEMENT DEVICE

[75] Inventors: Robert Spieldiener, Joseph-Rheinberger-Strasse 18, FL-9490 Vanduz, Liechtenstein; Reinhold Spieldiener, Aussichtsstrasse 23, CH-8704 Herrliberg, Switzerland; Patrick Spieldiener, Erlenstrasse 134, CH-8832 Wollerau, Switzerland; Alfons Saiko, Speerstrasse 26a, CH-8942 Oberieden, Switzerland; Peter Rosner, München, Germany

[73] Assignees: Alfons Saiko, Oberrieden; Reinhold Spieldiener, Herrliberg; Robert Spieldiener, Vaduz; Patrick Spieldiener, Wollerau, all of Switzerland

[21] Appl. No.: 08/930,929
[22] PCT Filed: Apr. 12, 1996
[86] PCT No.: PCT/EP96/01554
  § 371 Date: Oct. 10, 1997
  § 102(e) Date: Oct. 10, 1997
[87] PCT Pub. No.: WO96/32172
  PCT Pub. Date: Oct. 17, 1996
[30] Foreign Application Priority Data
  Apr. 13, 1995 [DE] Germany ............ 295 06 374

[51] Int. Cl.[7] ............................................. B60L 7/28
[52] U.S. Cl. ..................... 188/161; 188/164; 472/131
[58] Field of Search ............................ 472/2, 131, 50, 472/49; 188/158, 161, 164

[56] References Cited

U.S. PATENT DOCUMENTS

| | | | |
|---|---|---|---|
| 2,221,215 | 11/1940 | Everly . | |
| 3,625,317 | 12/1971 | Baermann | 188/165 |
| 3,723,795 | 3/1973 | Baermann | 310/93 |
| 3,837,442 | 9/1974 | Baermann | 188/159 |
| 4,482,034 | 11/1984 | Baermann | 188/165 |

FOREIGN PATENT DOCUMENTS

| | | |
|---|---|---|
| 591 378 | 9/1977 | China . |
| 20 08 432 | 9/1971 | Germany . |

*Primary Examiner*—Kien T. Nguyen
*Attorney, Agent, or Firm*—McDermott, Will & Emery

[57] ABSTRACT

The invention concerns an amusement device (1) with one or several passenger carriers (2) and a framework (3). It is preferably designed as dropping framework. To brake down the movable passenger carriers is provided an eddy current brake (4). It is preferably designed as linear brake. It is so designed that by influence of the different brake factors it develops basically a constant braking effect by compensating the declining drop speed.

17 Claims, 8 Drawing Sheets

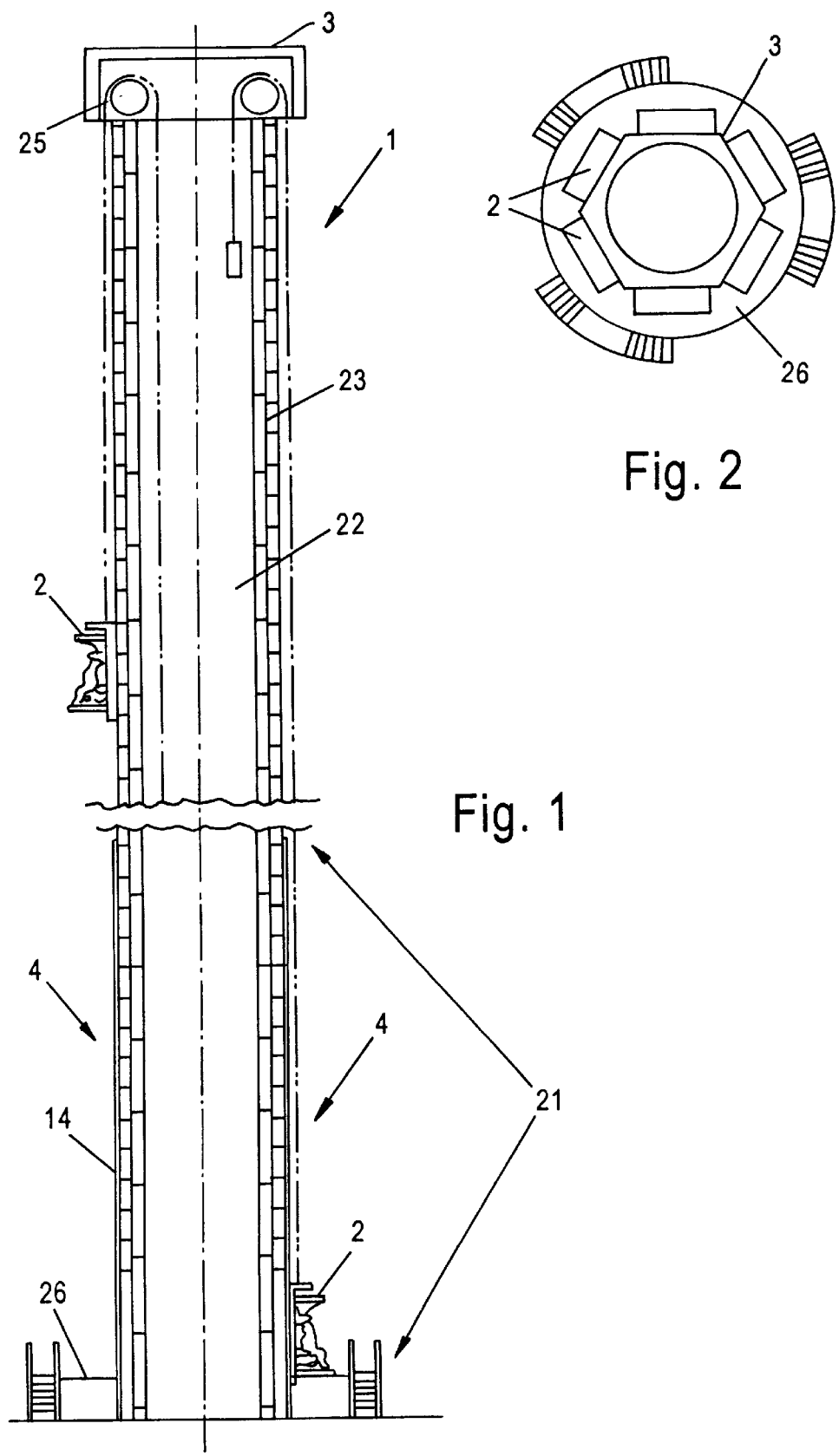

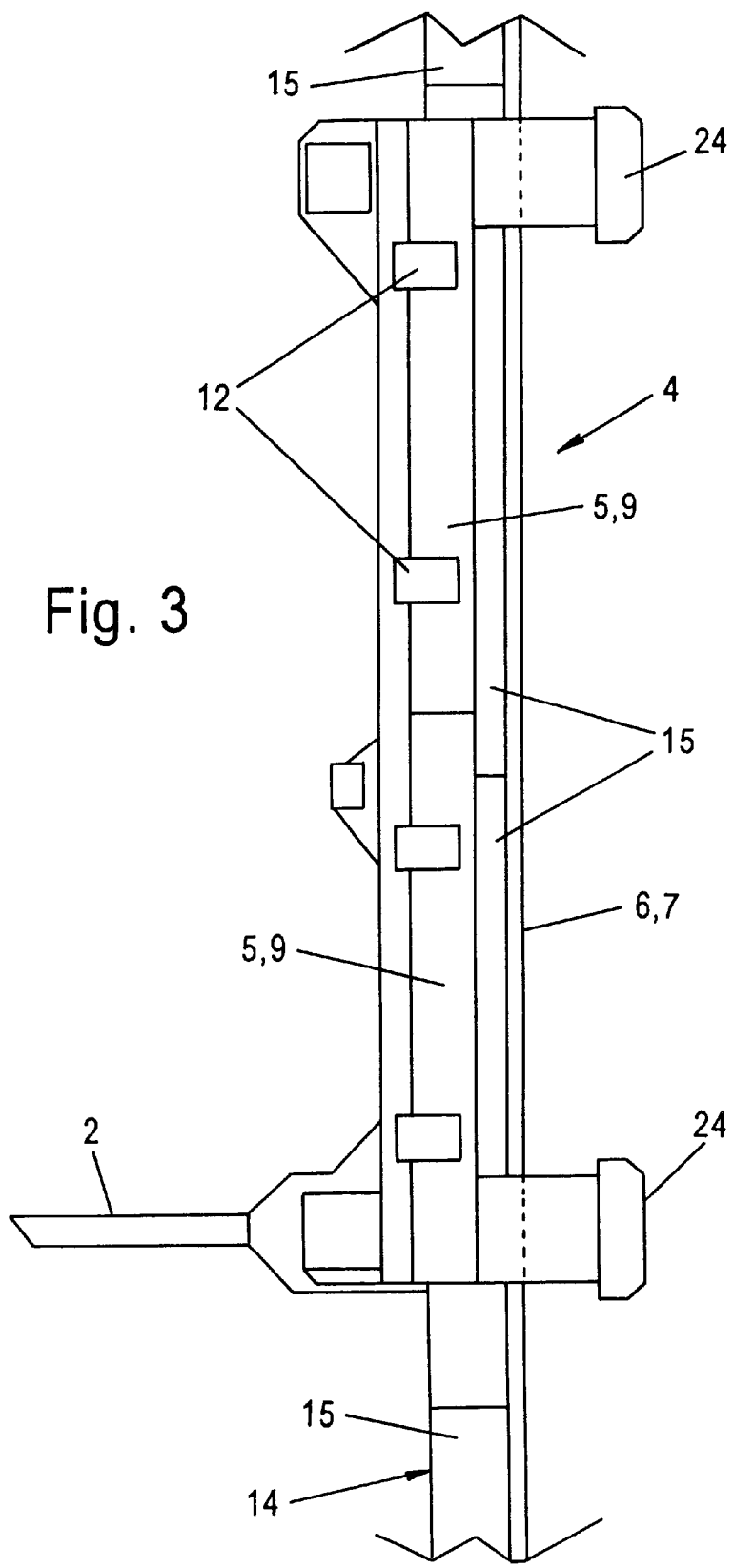

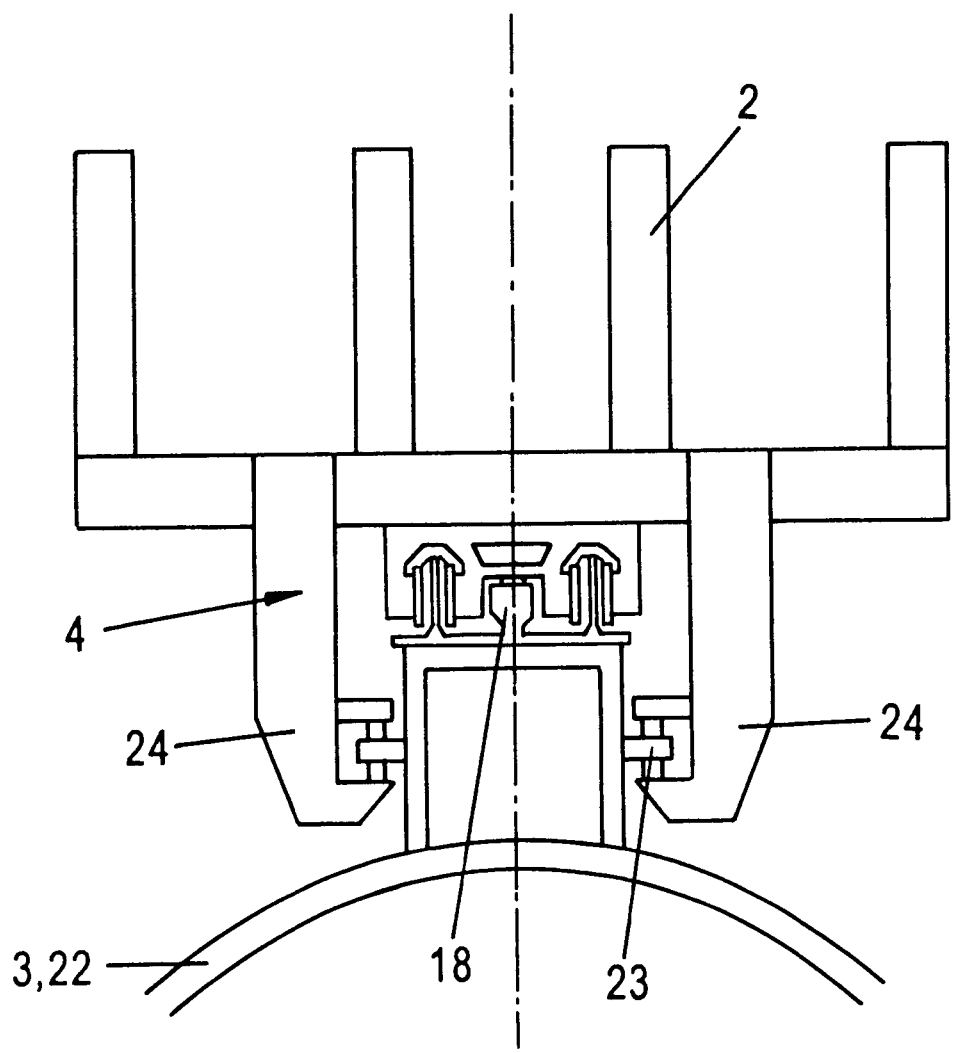

Fig. 7
Fig. 8
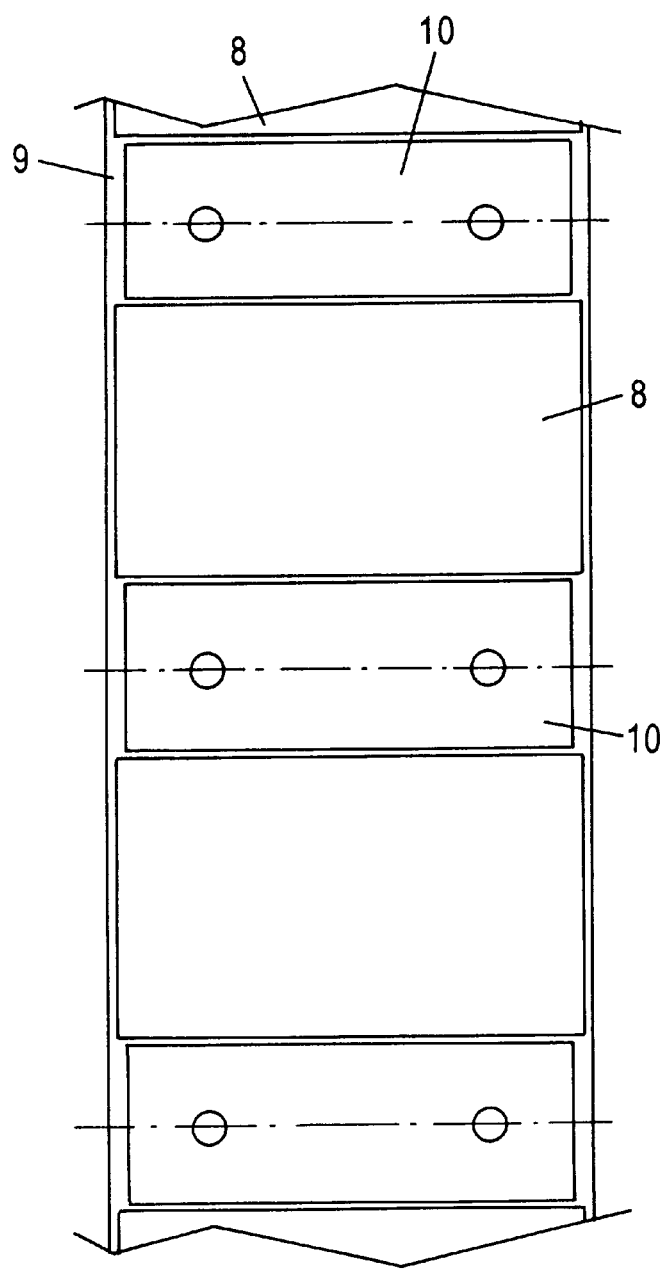
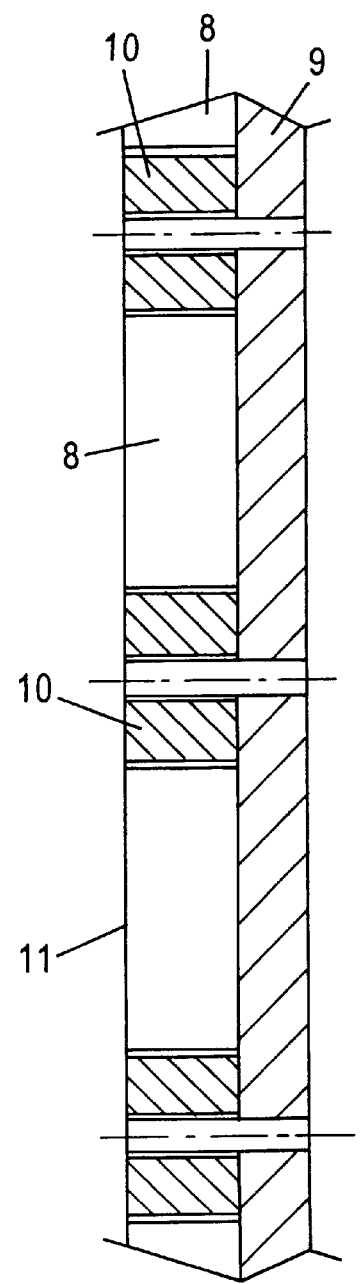

BRAKING SYSTEM FOR AN AMUSEMENT DEVICE

The invention concerns a device for the public amusement with the characteristic in the main claim.

A such amusement device is know from the U.S. Pat. No. 1,827,162 in form of a tram way. In the practice such amusement devices are known also in different other designs, for examples as roller coaster, drop devices, ramp rides, loopings or that sort of thing. They have fixed and relative to it, movable deviced parts in which normally the movable parts are built as passenger carrier and the fixed device parts as framework, ride lane or that kind of thing. The amusement devices have a brake gear with that the movable device parts are braked down and if necessary are brought to a standstill. The U.S. Pat. No. 1,827,162 shows a mechanical working friction brake that for example is built as double jaw brake. Here are working movable brake grippers, which are placed on both sides in the ride line, on a central brake sword at the vehicle. For the operation are necessary brake drives and a control system. In addition the brake grippers have a considerable wear and tear and have to be replaced regular. The brake gear have need to a frequent and intensive monitoring and maintenance.

In other untypical areas of the technology eddy current brakes are known in different designs. The DE-C-36 02 612 shows a rotatory eddy current brake for the use in the wheel hub of trucks. According to the literary reference "Prinzip, Entwicklung und Konstruktion der linearen Wirbelstrombremsen" in ZEV-Glas. Ann. 109 (1985) Nr. 9 September, pages 368 to 374 and the DE-A-37 43 934 eddy current brakes are also used in high speed trains like the ICE. An induction brake for magnetic levitation vehicles shows the DE-U-94 06 330. A switchable permanent-magnetic brake for rail vehicles is shown in the DE-A-29 31 539 and the EP-A-00 57 778. Fixed permanent magnets are here combined with mechanical moved permanent magnets to switch on and off the braking effect. In all these fields of application it concerns brakes for vehicles with their own drive and a voltage supply. At amusement devices often this does not exist.

It is the purpose of the here available invention to present a better brake gear for amusement devices.

The invention solves this purpose with the characteristic in the main claim. In consideration to the invention the brake gear is designed as eddy current brake. An eddy current brake is resistant to abrasion, mechanical robust, immune from interference and largely insensitive to external influences. It needs considerably less monitoring-, maintenance- and adjusting-work as a mechanical friction brake. It works more reliably and has decisive advantages by the failure security and the accident security. In addition are necessary neither brake drives nor control- nor operating devices, at least in the simple design. The dispensability of brake drives is certainly an advantage for amusement devices where the vehicles are driven by gravity and that do not have a motor and a voltage supply.

The characteristic of the eddy current brake can be influenced in a wide range and can be adjusted optimal to the prevailing application as well as to the kind of amusement device. For that different brake parameters are available that can be combined and adjusted in their effects. The adjusting possibilities are greater and the necessary work is smaller than with a mechanical brake.

Especially can be attained an ergonomically better and basically constant brake pressure. The jerk occurs at the beginning of the brake phases. The graduating of the coating and the linear arising overlapping of conducting part and energizing part affects a especially favourable stabilization of the jerk.

The build-up time of the eddy current brake is permanent adjustable and is hardly subject to external environment condition like humidity, temperature, etc. For that reason the braking effect is basically constant even with the changing operation conditions.

According to the invention the eddy current brake is preferably designed as linear brake that is developing the braking effect along a certain distance. A special advantage is the possibility to change the braking effect along the length of the braking distance. For that reason a soft beginning of the braking can be ensured with an ergonomically favourable and safe deceleration that keeps the attraction of the ride.

An eddy current brake has the especially advantage that it has a certain self regulation. With that the weight differences at the passenger carrier are regulated so that independent of weight and number of passengers basically always the same braking effect respectively the same braking deceleration is attained.

This is especially favourable for rides as dropping frameworks at which on a vertical or sloping tower one or several passenger carriers are pulled up and then after the release falls down freely. Here especially requirements are made on the braking effect and especially on the failure- and accident-security that especially an eddy current brake can fulfill. Also the leveling of the weight differences by the eddy current brake is here in especially advantage.

For the reverse drive of the passenger carrier the eddy current brake can be switched off or weakened. Through this the needed driving power and the reverse driving time can be reduced. The capacity, the throughput of the passengers and the economical efficiency of the amusement device arise. Especially advantages are resulting for dropping frameworks.

In the subclaims are given further advantageous forms of the amusement device and of the eddy current brake.

The invention is presented for example and schematically in the drawings. It shows in detail.

FIG. 1 is a side elevational view of an amusement device incorporating a braking assembly in accordance with the present invention.

FIG. 2 is a top view of the amendment device.

FIG. 3 is a side elevational view of a passenger carrier and the brake assembly of the amusement device.

FIG. 4 is a top plan view of the passenger carrier and the brake assembly.

Figure 6:
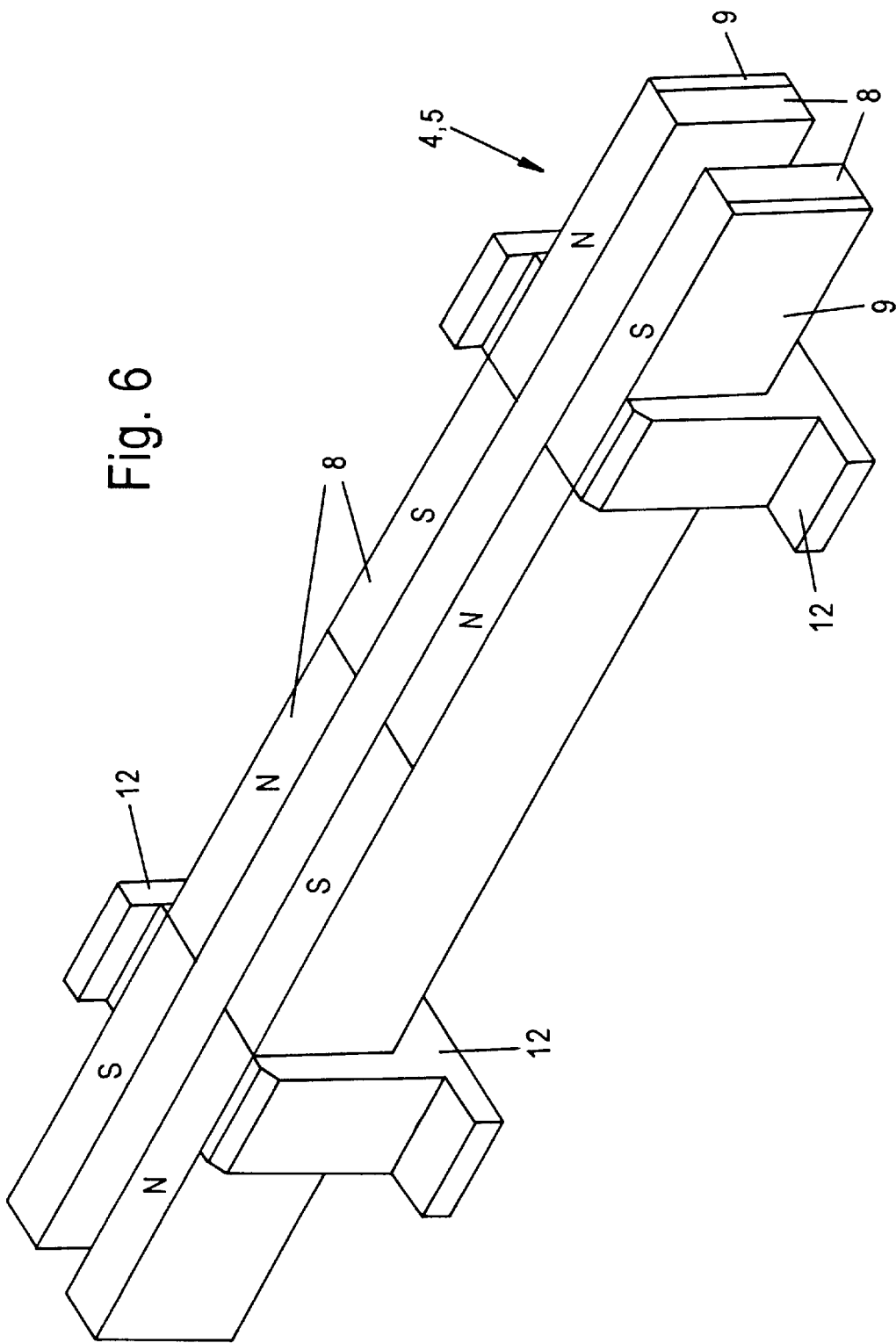

FIG. 6 a perspective view of the energizing part of the brake assembly.

FIG. 7 is a top plan view of the magnet arrangement.

FIG. 8 is a cross-sectional view of the magnet arrangement.

Figure 9:
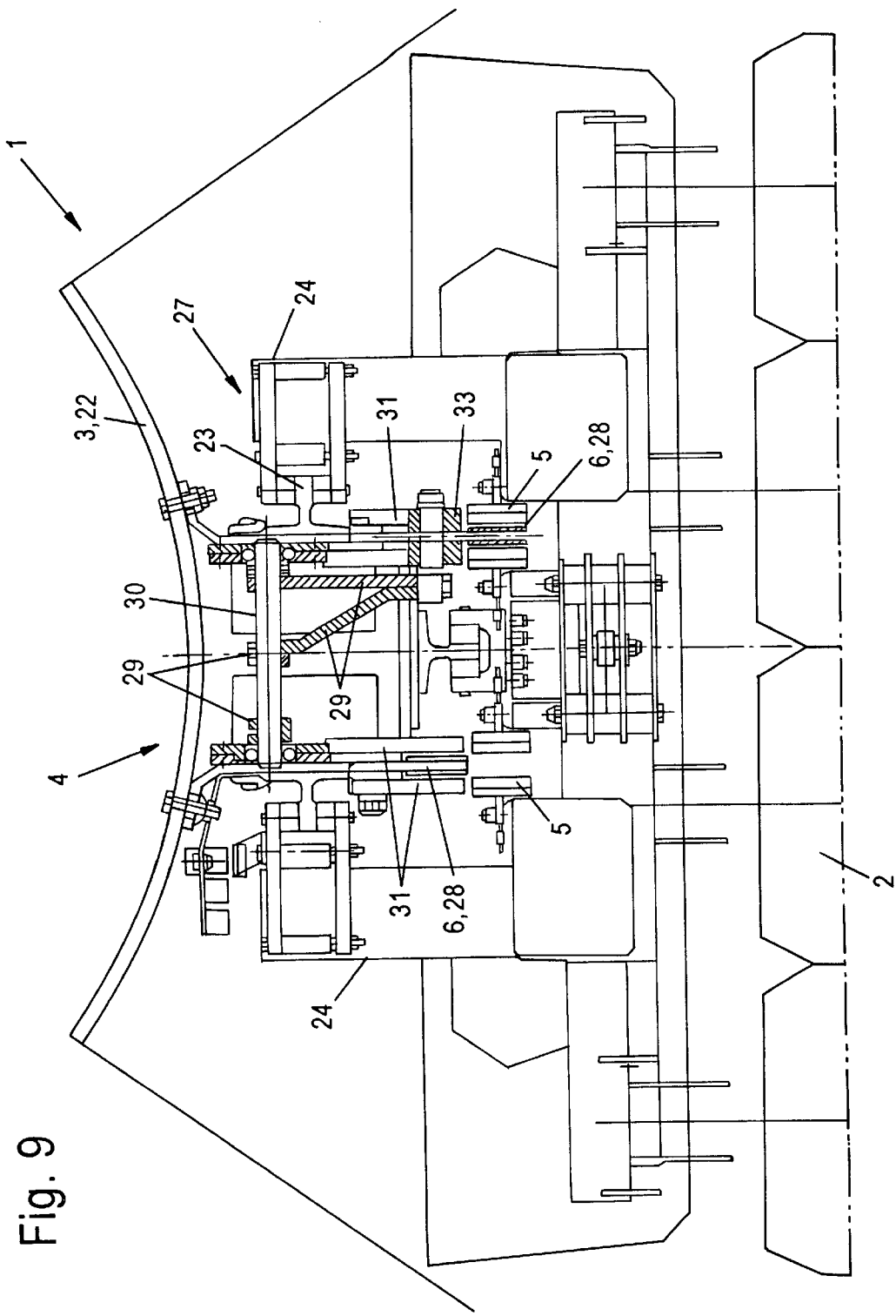

FIG. 9 is a top plan view of a switching device to switch off or to weaken the braking effect.

Figure 10:
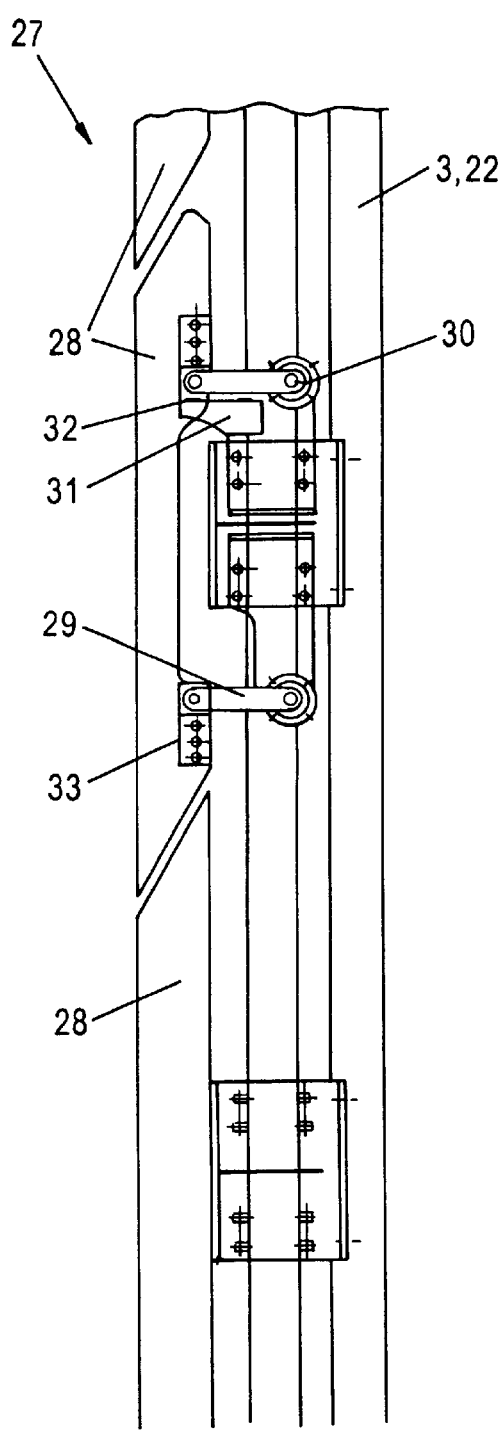

FIG. 10 is a side elevational view of a conducting part in a first operative position.

Figure 11:
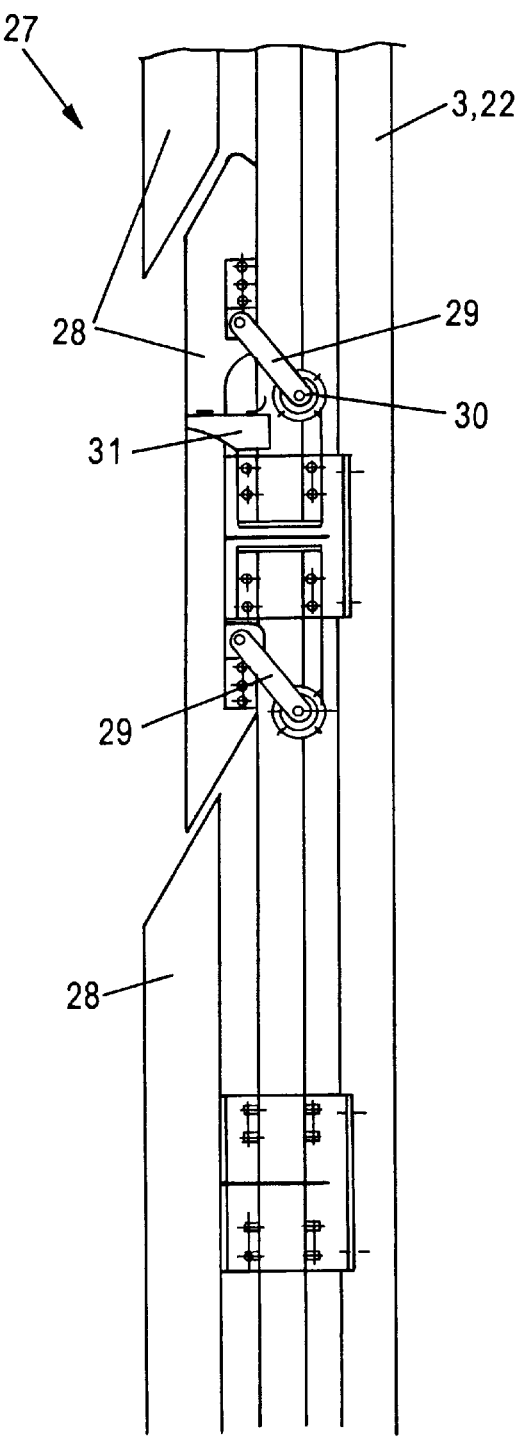

FIG. 11 is a side elevational view of the conducting part in a second operative position.

FIGS. 1 and 2 illustrate a general arrangement of an amusement device (1). The amusement device (1) is formed as a ride having a dropping framework. The amusement device (1) has a fixed device part (3) which is in the form of a high vertical or slop tower (22) with a platform (26) positioned on the ground. Several movable device parts (22), such as passenger carriers, are configured for vertical travel up and down the tower along running rails (23). Alternatively a bigger gondola can be provided. The passenger carrier(s) (2) can also be configured for turning itself around the tower. In such situations, the passenger carrier (2) would also include corresponding turning bearing and, if necessary, a turning drive.

The passenger carriers (2) are pulled up the tower (22) by means of a lifting drive (25). At the top of the tower (22) they are released by the lifting drive (25) and fall down in a free fall driven by gravity. The passenger carriers (2) are guided along the running rails (23) by traveling gears (24). At least at the lower end of the tower (2) a braking distance (21) is provided to decelerate the drop with an eddy current brake assembly (or brake gear (4).

The eddy current brake assembly (4) is preferably designed as linear brake that softly decollate the drop and reduces the drop speed to a small residual value. Near the ground, a shock absorber (not shown) can also be placed for bringing the passenger carriers (2) to a standstill at the platform (26). The eddy current brake assembly (4) is so designed that the deceleration is smaller than 5 g and the maximum deceleration is reached only after approximately 0.5 second or later.

In the place of the dropping framework illustrated in FIGS. 1 and 2, the amusement device (1) can also be designed in any other way for example as roller coaster or that sort of thing. The eddy current brake assembly (4) is especially suitable for rides in which the movable device parts (2) are driven by their own weight and by gravity.

FIGS. 3 and 11 clarify the design of the eddy current brake assembly (4) in detail. Referring to FIG. 3, the eddy current brake assembly (4) consists of at least one energizing part (5) having an arrangement of magnets, and of at least one conducting part (6) with an electrical guiding arrangement. Both the energizing and conducting parts (5,6) are designed in the form of a rail and stretch along the drop directions. Between the energizing part (5) and conducting part (6) exists an interferric gap (7). In the shown construction example, the energizing part (5) is placed at the movable device part (2) i.e., the passenger carrier. The conducting part (6) is placed at the fixed device part (3) i.e., at the tower (22). The conducting part (6) is considerable longer than the energizing part (5).

The relation can also be reversed. Such a change is recommended, for example, by a roller coaster where the conducting part (6) is placed at the different passenger carriers and the energizing part (5) is fixed at the braking distance in the station area.

FIGS. 3 to 8 clarify the design of the eddy current brake assembly (4) in detail. The passenger carrier (2) has a framework with several seats (not shown) and is mounted movable in the high by the prementioned traveling gear (24) at, at least one, vertical running rail (23) of the tower (22). The energizing part (5) and the conducting part (6) is existing always twice in which both energizing parts (5) are encompassing yokelike the accompanying conducting parts (6). The design of the yolk compensates the magnetic force of attraction, at least partly, and simplifies the construction. Between the energizing parts (5), which were placed with a lateral distance, is a slideway (18) that additionally supports the side forces and stabilizes the eddy current brake assembly (4).

Figure 5:
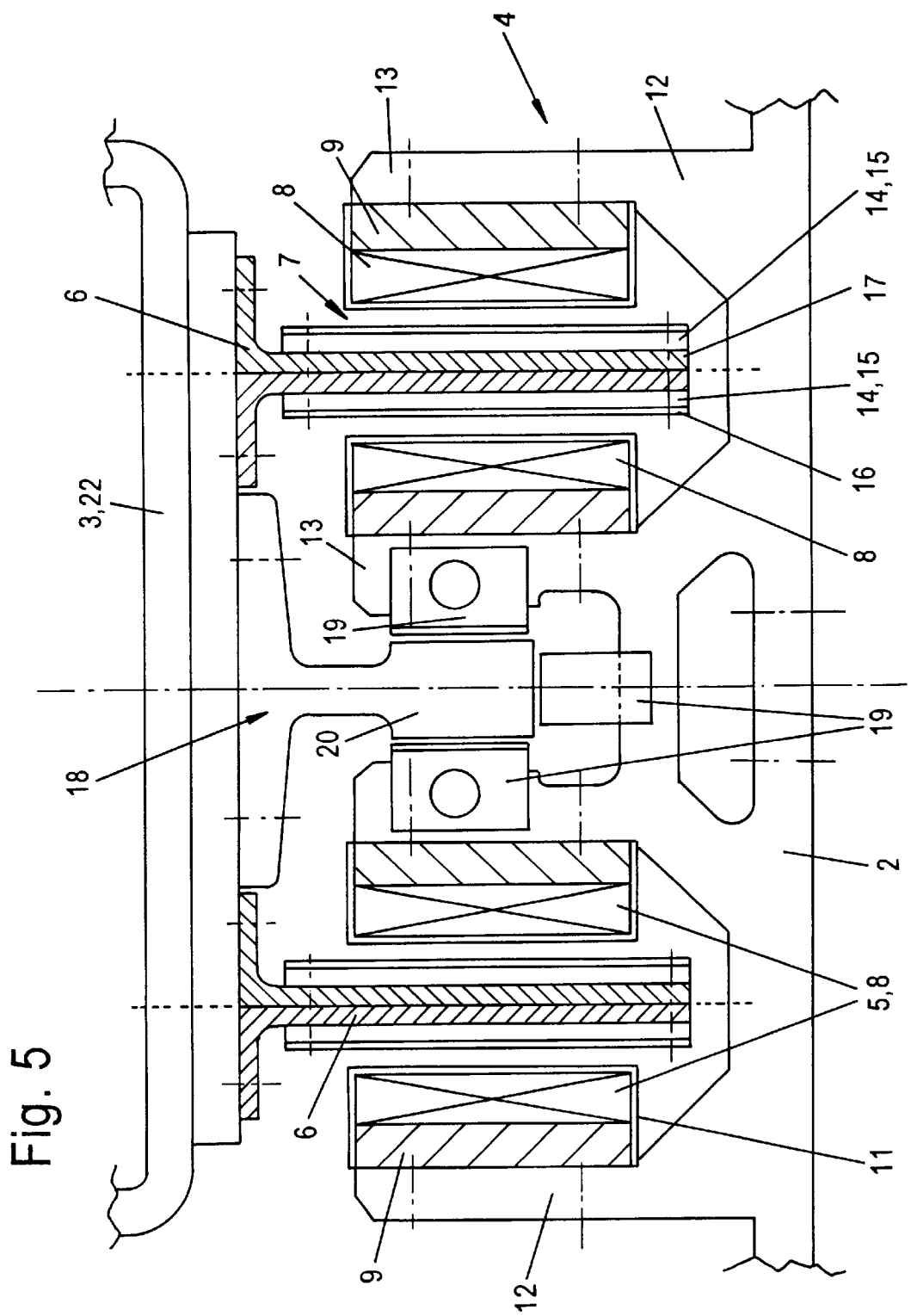
FIG. 5 is an enlarged view of the brake assembly.

As shown in FIGS. 4 and 5, the energizing part (5) has two magnet carriers (12) that are always designed as a yoke. Inside at the yoke arms (13), the magnet arrangement is configured as a rail. They are made of several magnet elements (8) which are placed in a row one behind the other. They are formed preferably as strong permanent magnets made of a suitable material (for example NdFe).

The magnet elements (8) are mounted on a continuous magnetically conductive metallic carrying rail (9) that, in the available design example, is designed as iron back. It also can be made out of any different suitable material. Above the magnet elements (8), is placed preferably a covering (11) that is mounted on the carrying rail (9). The covering (11) can be made of a non-magnetic stainless steel or any other suitable material.

FIG. 6 illustrates the two raillike magnet arrangements in a parallel orientation and having a finite length of approx. 2 m. FIGS. 7 and 8 show the arrangement of the magnet elements (8) in detail. The magnet elements (8) are placed along the carrying rail (9) one behind the other. The gap between them is filled with a non-magnetic intermediary (10). Also they are supported in dropping direction. The fixing of the magnet elements (8) and the intermediaries (10) can be realized by sticking them together with the carrying rail (9), with dowel pins or by any other suitable way.

According to FIG. 6, the polarity of the magnet elements (8) are reversed along the direction of the carrying rail (9). Accordingly, magnet elements (8) that are placed one behind the other always have a different polarity. A difference of polarity also exists between the magnet elements (8) located on the opposing rails (9). The magnetic flux is running through this polarity between the two magnetic rails crosswise through the conducting part (6). With that in the conducting part (6) can be saved material.

FIGS. 4 and 5 illustrate how both conducting parts (6) are made of a vertically orientated coating carrier (17) in form of a rail that is fixed at the tower (22). The rail (17) extends preferably, along the whole tower height. In the area of the braking distance (21), a conductive coating (14) made of an electrical conductive material, for example copper, aluminum, stainless steel or the like can be formed on both sides of the coating carrier (17). Between the conductive coatings (14) and both sides encompassing magnet arrangements (8) exists an interferric gap (7). The conductive coatings (14) are also provided with a non-magnetic covering (16), for example a sheet metal made of copper or that sort of thing.

At the drop of the passenger carrier (2) the magnet elements (8) run, within the braking distance (21), and over the coating carrier (17) and the conductive coatings (14). The movement of the passenger carrier (2) induces eddy currents that create a magnetic brake force. The brake forces depend on different parameters like drop speed, the alternating frequency, magnetic force, electrical conductivity, thickness of the coating carrier (17) and the conductive coatings (14), the width of the interferric gap, overlapping of energizing- and conductive part (5,6) etc. The brake force can be influenced by changing and combining any of the listed parameters.

The eddy current brake assembly (4) has with the dependence from the speed of a certain self regulation and is largely leveling weight- and loading differences of the multiple seated passenger carrier (2). The greater the weight of the passenger carrier, the slower the reduction in drop speed under the influence of the braking effect. On the other hand, the consequence is that a greater brake force must be applied to compensate at least partly, for the higher speed resulting from the excess weight.

The braking effect can be adjusted free in a wide range. Over the length of the braking distance (21), the brake forces can vary or be constant. In the preferred and presented design example, the eddy current brake assembly (4) is so designed that the brake force basically will be constant even if the drop speed is declining. Hence, a short and favorable braking distance is achieved.

The brake force essentially depends on the drop speed or running speed, and the alternating frequency. The characteristic curve of the brake force is basically a convex curve. With increasing speed, the brake force increases more or less steeply, depending on the conductive material, to a maximum value, and then declines again. In the practical useable range of the characteristic curve, a decreasing speed or frequency, caused by the braking, will normally decrease of the brake force. This loss brake force can be compensated by different measures that are described as follow.

The brake force depends on the electrically conductivity (i.e., the material of the coating carrier (17) and the coatings (14)) as well as on their thicknesses. In the shown design example, the conductive coating (14) consists of several coating elements (15) that are placed one behind the other. Within the row of coating elements, the coating material and the electrical conductivity are varied. At the beginning of the brake distance (21), are placed one or several coating elements (15) made of a stainless steel, followed by aluminum and at least copper. The increased electrically conductivity of the coating elements (15) increases the brake force along the braking distance (21). Additional or alternatively the thickness of the coating elements (15) can change. It increases continuously or element by element that increases the brake force also.

The alternation frequency also influences the brake force. Additional or alternatively, at the energizing part (5), the length of the magnet elements (8) can change, for example, by shortening them from the bottom to the top along the carrying rail (9). With the shorter length of the magnetic element and the correspondingly higher alternating frequency, the brake force in the front area of the energizing part (5) is higher than in the lower (or rear) area. This has an effect especially at the beginning of the braking distance (21) when the energizing part (5) meets the conducting part (6) for the first time and is overlapping them little by little. The influence of the alternation frequency by the different length of the magnet elements (8) is especially suitable for a fix placed energizing part (5) how it can be provided in the station area of tract rides like roller coaster, etc. But it is also usable for the shown eddy current brake (14) with movable energizing part (5).

The braking effect depends also on the grade of the overlapping of the two parts (5,6). The braking effect increases with the size of the overlapping. The linear increasing overlapping results in an especially soft beginning of the braking and an ergonomically favorable constant jerk.

With increasing overlapping comes to an effect the, possibly shorter, magnet elements (8) that are placed in the front area and increase the brake force by the increased alternation frequency. They compensate, at least partly, for the loss of brake force that is caused by the braking itself and by the declination of the drop speed. This effect occurs not only with the initial entry into the braking distance (21), but at each changing of the coating material and/or thickness of the coating.

The overlapping can be changed also crosswise to the rail axis by the immersion depth of the conducting part (6) into the yokelike energizing part (5). This measure is offered especially in the rail area above the conductive coating (14). The width of the coating carrier (17) of the rail can increase along the drop distance and increase the brake force. Alternatively the width of the magnet elements (8) can also be varied. Otherwise, it is favorable at least in the full effective braking area, to increase the width of the coating elements (14) relative to the magnet elements (8) and to let them overlap at both sides.

In the shown design example of FIGS. 1 to 8 the energizing and conductive parts (5,6) are their supporting structure. According to alternate embodiment illustrated in FIGS. 9 to 11 and later explained in detail, the energizing and/or conducting parts (5,6) can also be provided in a movable arrangement. For braking, the energizing parts (5) that, for example, are placed at the passenger carrier (2), can be pushed forward by a suitable actuator and can be brought to an overlapping with the conducting parts (6). In home position or to release the eddy current brake (4), for example to pull-up the passenger carrier (2), the energizing parts (5) can be pulled-back and can be taken out of contact. A pull-back spring or something like that can serve as a failure safety device. The feed arrangement and the kinematics can be turned over too.

A further possibility of influence exists by the variation of the effective width of the interferric gap (7) between the magnet elements (8) and the coating carrier (17). The coating carrier (17) consists of at least of an electrical and, if necessary, a magnetically, conductive material such as construction steel or stainless steel. By changing the rail thickness (17), the width of the interferric gap can also be changed. The bigger the rail thickness and the smaller the interferric gap the higher the resulting brake force.

Further, these exists also a possibility for influencing the brake force by the magnet force. For example different strong magnet elements (8) can be used. This can be realized by the choice of the material or by the use and drive of electromagnets. This variant is especially suitable for a fixed arrangements of the energizing parts (5).

At the end of the braking distance (21), exist essentially a balance between gravity and the brake force of the eddy current brake (4). The dimensioning of the brake is chosen so that the passenger carrier has an end speed of approx. 1.5 m/s. A small shock absorber is typically sufficient brake down the passenger carrier to standstill.

To absorb the lateral components of the eddy current brake assembly (4) an additional slideway (18) can be used. The slideway (18) is fixed is the tower (22) and consists of a vertical guiding rail (20) at which sliding blocks (19) are catching from three sides. The sliding blocks (19) are placed at the yoke arms (13) and at the joining element between the two yokes (12).

The eddy current brake assembly (4) can be equipped with a security and monitoring device that, for example, contains measuring instruments the field intensity of the energizing part (5), the temperature of the conducting part (6), etc. It can detect operational troubles and in the case of emergency, it can switch off the amusement device (1).

For the reverse drive of the passenger carrier (2) the eddy current brake (4) can also have a switchoff device (27) or a device to weaken the braking effect. This is especially advantageous for the dropping framework like in the presented design form. Preferably, the braking effect is weakened in the reverse motion direction of the passenger carrier (2). This happened with a, at least partly, spread out in opposite directions of energized part (5) and conducting part (6). For that purpose the conducting part (6) is preferably placed yielding in the reverse motion direction of the passenger carrier (2) that means in the direction to the top of the tower.

This can happen with a swivel bearing (30) with several connecting rods (29). It is used preferably a parallelogram— steering gear that the conducting part (6) let yielding backwards by keeping its vertical orientation. At the pulling-up of the passenger carrier (2) the conducting part (6) is taken with the energizing part (5) by a magnetic force and, during the lifting motion, at least partly brought out of contact with the yoke (12). With the smaller overlapping between the guiding and energizing parts (6,5), the brake force which opposes the lifting motion is decreased. FIG. 9 shows the position of the brake and the switch-off position with pulled-back conducting part (6). FIG. 10 and 11 shows the two positions in side view.

In this connection, it is preferable to separate the conducting part (6) in several separate movable segments (28) which, one, after one makes way by running over the energizing part (5). The upper and lower edges of the segments (28) can be orientated at an angel corresponding to the direction of motion. The resent of the segments (28) which made way respectively of the complete conducting part (6) happened by gravity. Alternatively can exist also a drive.

In addition, at the tower (22) can be placed a row of limit stops (31) which for example the segments (28) respectively the conducting part (6) encompassing sideways like a fork. The connecting rods (29) pivoted by swivel bearings (30) at the inside of the limit stops (31) are carrying at their end a bolt that sideways juts out over the limit stops. With that bolt, they catch the relative segment (28) respectively the conducting part (6). In operation- and brake position the bolt rests on the limit stops (31). It can have a damper (32) as an end-of-travel support. Additional sensors can be placed at the limit stops (31) to signal the taking of operation- and brake position of the conducting part (6) respectively of the elements. With that the failure of separate segments (28) can be made out timely and, if necessary, counter-measures can be taken and the eddy current brake (4) can be switched off to be on the safe side.

Modifications of the presented design form are possible in different ways. On the one hand the braking distance (21) can be lengthened to the top over a greater area and, even if necessary, along the whole height of the tower (22). In the top area are than for example blank rails (17) that thickness and/or width are changing and increasing along the dropping distance. With that, just at the beginning occur a comparatively weak braking effect. The conductive coatings (14) are placed than only in the lower rail area and in the described way.

A further possibility of variation exists in the kinematic turning back of the energizing part (5) and conducting part (6) and also in kinematic turning back of the sideway (18). Further, the yoke can be formed with two conducting parts (6) that are encompassing an energizing part (5). At the place of the yoke, form any other arrangement of energizing- and conducting part (5,6) can be used. For the adjustment of the eddy current brake assembly (4) suitable adjusting mechanisms are placed at the guiding- and energizing parts (5,6).

Finally the eddy current brake can also be designed as a swivel part and as rotary brake and, for example, be placed at the wheels of passenger carriers (2), at cable winches, at gears or that sort of things. The braking effect is then obtained preferably by changing the distance between the guiding- and energizing part.

Reference Sign List
1 Amusement device
2 Movable device part, passenger carrier
3 Fixed device part, framework
4 Brake gear, eddy current brake
5 Energizing part, magnet arrangement
6 Conducting part, electrical conductive arrangement
7 Interferric gap
8 Magnet element
9 Carrying rail
10 Intermediary
11 Covering
12 Magnet carrier, yoke
13 Yoke arm
14 Conductive coating
15 Coating element
16 Covering
17 Coating carrier, rail
18 Slideway
19 Sliding block
20 Guiding rail
21 Braking distance
22 Tower
23 Running rail
24 Traveling gear
25 Lifting drive
26 Platform
27 Switch off device
28 Segment
29 Connecting rod
30 Swivel bearing
31 Limit stop
32 Damper
33 Sensor

We claim:

1. A braking device for use with an amusement apparatus having a fixed device part, at least one running rail secured to the fixed device part, and a movable device part including at least one traveling gear configured for movement along the at least one running rail, the braking device comprising:
   an eddy current brake assembly including:
      a conducting part having at least one conductive rail configured for attachment to the fixed device part, said at least one conductive rail being adapted to extend the length of the fixed device part;
      an energizing portion having at least one yoke aligned in correspondence with each said at least one conductive rails, each said yokes including a pair of yoke arms for receiving said at least one conductive rail therebetween;
      at least one pair of carrying rails extending a predetermined distance along the direction of said at least one conductive rail, each said carrying rails being mounted on corresponding yoke arms of said plurality of yokes;
      a plurality of magnet elements mounted on each of said carrying rails with alternating polarities, said plurality of magnet elements being further arranged such that the poles of magnet elements mounted on one carrying rail have opposite polarities from the poles of magnet elements mounted on a corresponding carrying rail of said at least one pair of carrying rails; and
      an intermediary disposed between adjacent pairs of said plurality of magnet elements;
   wherein:
      an interferric gap is defined between each said yoke arms and the at least one conductive rail, and
      movement of the movable device part, relative to the fixed device part, induces eddy currents that create a magnetic brake force between said conducting part and said energizing part.

2. The braking device of claim 1 wherein said intermediary is non-magnetic.

3. The braking device of claim 1 wherein said eddy current brake assembly is a linear brake system.

4. The braking device of claim 1 wherein said eddy current brake assembly provides a constant rate of deceleration over a predetermined braking distance.

5. The braking device of claim 1 wherein said carrying rail is magnetically conductive.

6. The braking device of claim 1 further comprising a covering disposed over said plurality of magnet elements.

7. The braking device of claim 1 wherein said plurality of magnet elements have equal lengths along a predetermined braking distance.

8. The braking device of claim 1 wherein said plurality of magnet elements have unequal lengths along a predetermined braking distance.

9. The braking device of claim 1 further comprising a switching device for reducing or eliminating the effects of said eddy current brake assembly when said movable device part travels in a predetermined direction that is opposite a direction in which said eddy current brake assembly is normally active.

10. The braking device of claim 1 wherein said energizing portion is configured for attachment to said fixed device part, and said conductive portion is configured for attachment to said movable device part.

11. The braking device of claim 1 further comprising:
an actuator device attached to said energizing portion;
said actuator device being adapted to connect said energizing portion to the movable device part;
said actuator device being further adapted for positioning said energizing portion.

12. The braking device of claim 1, further comprising at least one covering disposed over said plurality of magnet elements.

13. The braking device of claim 1 further comprising a sensor for indicating when said eddy current brake assembly is active and inactive.

14. The braking device of claim 1 further comprising:
a braking distance defined over a predetermined length of said conductive rail; and
a conductive coating formed on at least one side of said at least one conductive rail within said braking distance.

15. The braking device of claim 14 wherein said conductive coating is formed on each side of said at least one conductive rail.

16. The braking device of claim 15 wherein each side of said at least one conductive rail includes a conductive coating of a different thickness.

17. The braking device of claim 15 wherein each side of said at least one conductive rail includes a conductive coating of different materials.

* * * * *